No. 731,426. PATENTED JUNE 23, 1903.
W. F. BOSSERT & F. T. FOXENBERGER.
RING BUSHING FOR INTERIOR CONDUITS.
APPLICATION FILED FEB. 3, 1903.
NO MODEL.
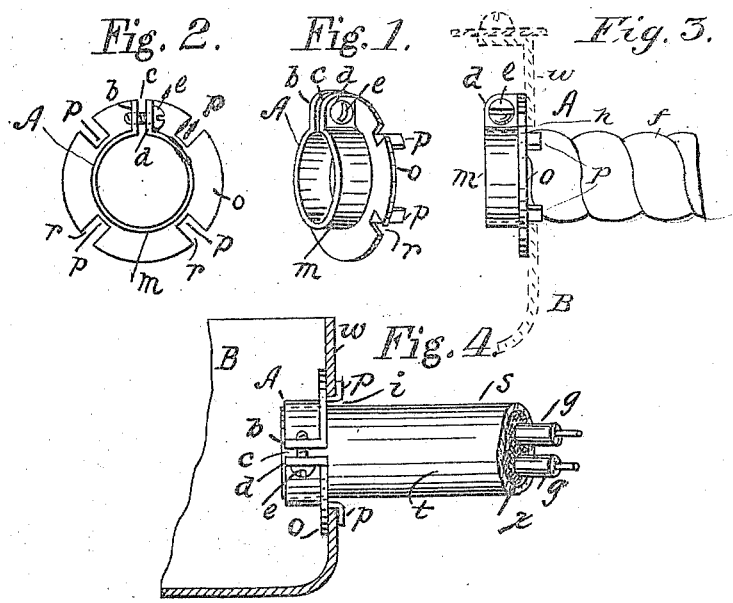
WITNESSES:
James E. Lynch.
Wm. J. Warlerton
INVENTORS
William F. Bossert
BY Frederick T. Foxenberger
Lowille Pierce
ATTORNEY.

No. 731,426.

Patented June 23, 1903.

UNITED STATES PATENT OFFICE.

WILLIAM F. BOSSERT AND FREDERICK T. FOXENBERGER, OF UTICA, NEW YORK, ASSIGNORS TO THE BOSSERT ELECTRIC CONSTRUCTION COMPANY, OF UTICA, NEW YORK.

RING-BUSHING FOR INTERIOR CONDUITS.

SPECIFICATION forming part of Letters Patent No. 731,426, dated June 23, 1903.

Application filed February 3, 1903. Serial No. 141,677. (No model.)

*To all whom it may concern:*

Be it known that we, WILLIAM F. BOSSERT and FREDERICK T. FOXENBERGER, residing at Utica, in the county of Oneida and State of New York, have invented certain Improvements in Ring-Bushings for Interior Conduits, of which the following is a specification.

The invention about to be described relates to means for holding the ends of interior conduits to the distributing-boxes into which they enter. With conduits made of iron pipe it is comparatively easy to provide a bushing to secure the ends thereof to the walls of the boxes; but there are in use a number of kinds of conduits other than iron, such as the so-called "flexible" conduit made from continuous narrow strips of metal disposed in a spiral form and also of the circular loom-conduit which is made from fiber woven in a tubular form and having a smooth insulated surface. The flexible conduit varies in diameter, and it has been found difficult to provide a bushing which will be suitable for holding the same firmly to the box and central of the hole it enters, and the circular loom-conduit is soft and slips easily through the ordinary bushing and does not stay in place.

The present invention provides means whereby any kind of conduit may be firmly held to the distributing-box and approximately central of the entering hole, and it consists of an open ring having a straight cylindrical portion adapted to embrace the end of the conduit and provided with means for entering the orifices in the walls of the box to maintain the conduit approximately central therewith and always keep it in position and with means for grasping or holding the conduit so that it cannot be withdrawn from the wall of the box, all of which I will now proceed to describe, and point out in the claims.

In the drawings which form a part of and illustrate the specification, Figure 1 is a perspective view of the ring-bushing forming the invention struck up from sheet metal. Fig. 2 is an end view of the ring-bushing. Fig. 3 is a side view of the ring-bushing attached to the end of a flexible conduit and showing its relation to a distributing-box, a portion of which is shown in dotted lines to represent a section thereof; and Fig. 4 is a sectional view of a distributing-box, showing the sheet-metal ring-bushing applied to what is known as a "circular loom-conduit."

In the drawings, A represents a ring-bushing struck up from sheet metal, steel preferably, in a well-known manner by means of dies. It is not necessary to describe all of the operations of manufacture, as they will be apparent to those acquainted with the art.

The ring-bushing A consists of the cylindrical part $m$, whose sides terminate in the ears $b$ and $d$, separated by the space $c$, across which and through the ears extends the screw $e$. $o$ is a flange on the rear of the part $m$ and joined to the ears, and $p$ $p$ are portions of the flange, cut out therefrom and bent rearwardly and at right angles thereto. The ring $m$ is adapted to embrace the end of a conduit, as $f$, and the screw $e$ holds the same firmly thereto, while the flange $o$ serves as an abutment against the wall $w$ of the box B, and the prongs $p$ enter the hole $i$ in the box through which the conduit extends and serve as the means to maintain the conduit approximately central of the orifice.

In Fig. 3, $f$ represents a flexible conduit made from narrow strips of metal bent around in a spiral form in a well-known manner. Such conduits vary slightly in diameter, and it is difficult to secure them properly by the ordinary bushings, as the latter are made of one diameter and when attached to the conduit do not closely fit the hole $i$ in the box, but leave small open spaces from the surface of the conduit into the box, which allows dust and other extraneous matter to enter the box.

The ring is made with a space $c$ wide enough to permit of the grasping and holding of the smallest diameter of conduit securely and the screw $e$ made long enough to allow the closing of the ring upon the largest conduit that can enter the hole $i$, and at the same time the prongs $p$ of the ring are enabled to enter the hole and keep the conduit in an approximately central position and hold the flange or abutment $o$ close to the wall of the box, so that there will not be any open space between the edge of the hole and the surface of the conduit except at c. The ring-bushing thus has flexibility and will take care of the conduits of varying diameters within certain sufficient limits.

Fig. 4 shows a ring-bushing A, attached to the end of a conduit or cable s, whose outer covering t is what is termed a "circular loom-conduit." As a matter of fact it is a cable-covering made or woven in a loom upon a cable and consists of stout, well-insulated, and fireproof fiber and although flexible and soft is comparatively quite stiff. The ring-bushing $A^2$ is enabled to grasp the end of this conduit firmly. The flange o presses as an abutment against the inner wall of the box, and the prongs p extend through the hole i in the box and keep the conduit approximately central therewith. In this figure the ends of the prongs are shown as bent over the outer wall of the box and as locking the ring-bushing to the box, thus making the fastening more secure.

We claim as our invention—

1. As an article of manufacture, a ring-bushing consisting of an open cylindrical part terminating in ears, a screw extending through said ears and adapted to contract the said part, a flange or abutment at one end of the cylindrical part at a right angle and integral therewith having a plurality of prongs cut out therefrom and extending rearwardly.

2. As an article of manufacture, a ring-bushing consisting of an open cylindrical part terminating in outwardly-extending ears, a screw extending through said ears and adapted to contract the said part, a flange or abutment at one end of the said part at a right angle therewith and integral with said part and joined to the ears having a plurality of prongs cut out therefrom and extending rearwardly.

3. As an article of manufacture, a ring-bushing drawn up from a sheet of metal with an open space and outwardly-extending ears and a screw through the same for adjusting the width of the space, joined to a tubular band, one end of which forms a right-angled flange extending from which and integral therewith are a plurality of prongs at equal distances from the center of the ring.

4. In combination, a distributing-box provided with a conduit-hole in one of its walls, a conduit entering said hole with a ring-bushing upon the end of the conduit having an open space and means for adjusting the width thereof, joined to a tubular band, one end of which has a right-angled flange and rests against the inner wall of the box, and provided with means extending from the band into the conduit-hole for approximately centraling the same consisting of rearwardly-extending prongs cut from the said flange.

5. The combination of a distributing-box provided with a conduit-hole in one of its walls, a conduit entering said hole, with a ring-bushing drawn up from sheet metal upon the end of the conduit, having an open space and outwardly-extending ears and a screw through the same for adjusting the width of the space, joined to a tubular band, one end of which forms an abutment against the inner wall of the box extending from which into the conduit-hole are a plurality of prongs at equal distances from the center of the ring.

6. The combination of a distributing-box provided with a conduit-hole in one of its walls, a conduit entering said hole, with a ring-bushing drawn up from sheet metal upon the end of the conduit, having an open space and outwardly-extending ears and a screw through the same for adjusting the width of the space, joined to a tubular band, one end of which forms an abutment against the inner wall of the box extending from which into the conduit-hole are a plurality of prongs at equal distances from the center of the ring and adapted to lock the ring to the wall of the box.

In testimony whereof we have signed our names to this specification, in the presence of two subscribing witnesses, this 31st day of January, 1903.

WILLIAM F. BOSSERT.
FREDERICK T. FOXENBERGER.

Witnesses:
JOSEPH C. FRANK,
WILLIAM GRAY.